May 17, 1938.  D. E. LEWELLEN ET AL  2,117,483
VARIABLE SPEED DEVICE
Filed July 12, 1935   4 Sheets-Sheet 1
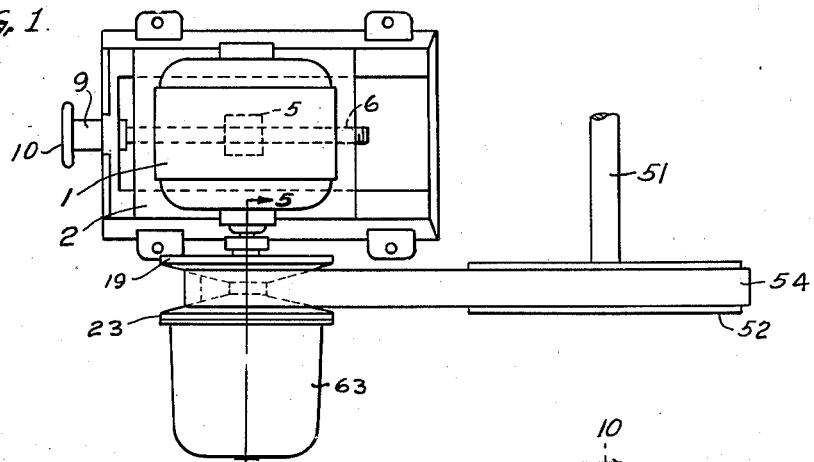
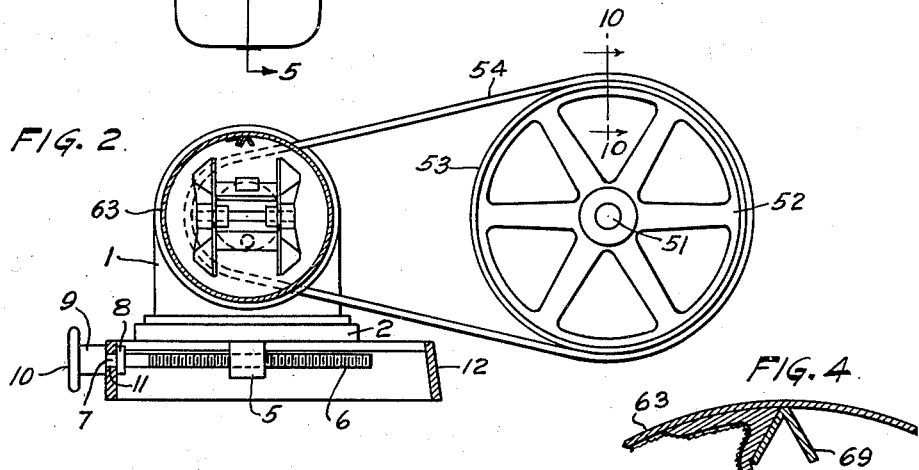
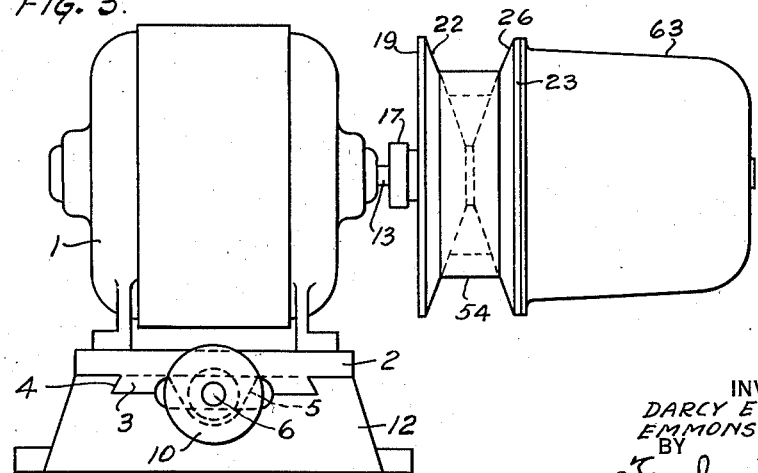
INVENTORS
DARCY E. LEWELLEN AND
EMMONS F. LEWELLEN
BY
Toulmin & Toulmin
ATTORNEYS

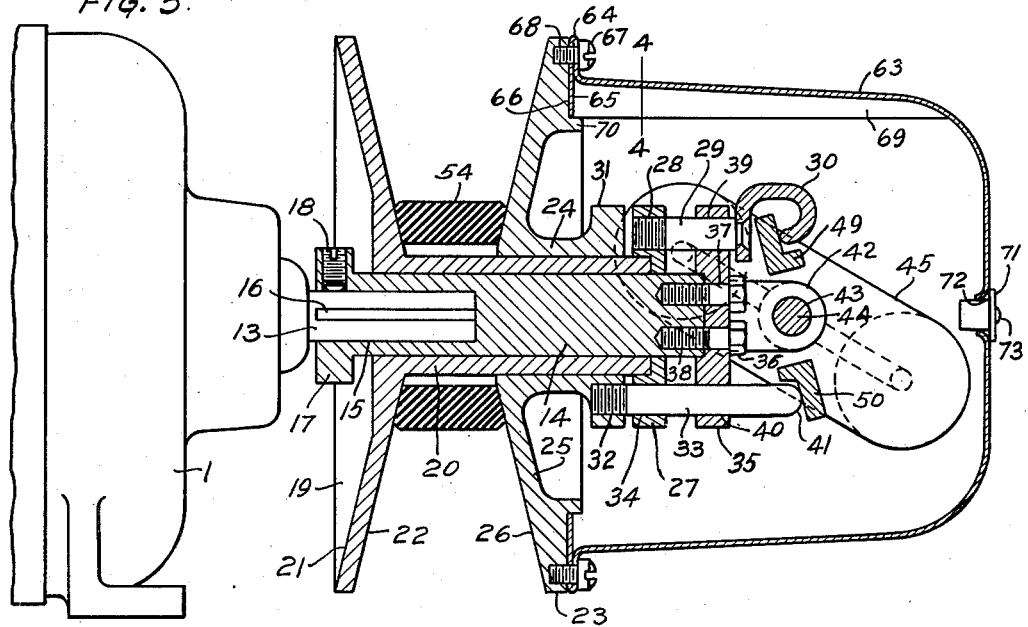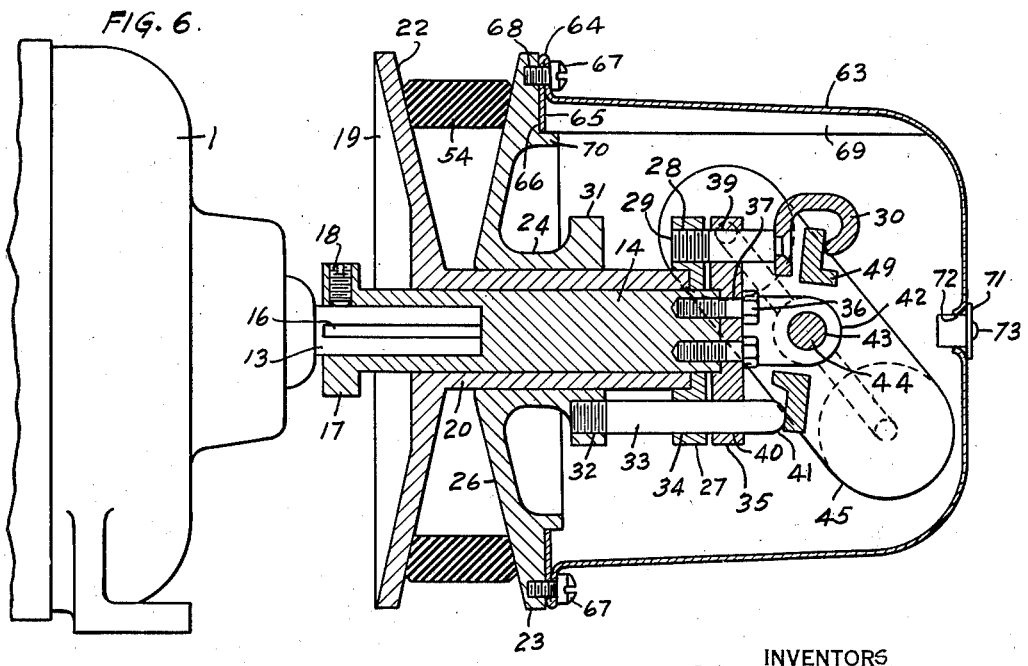

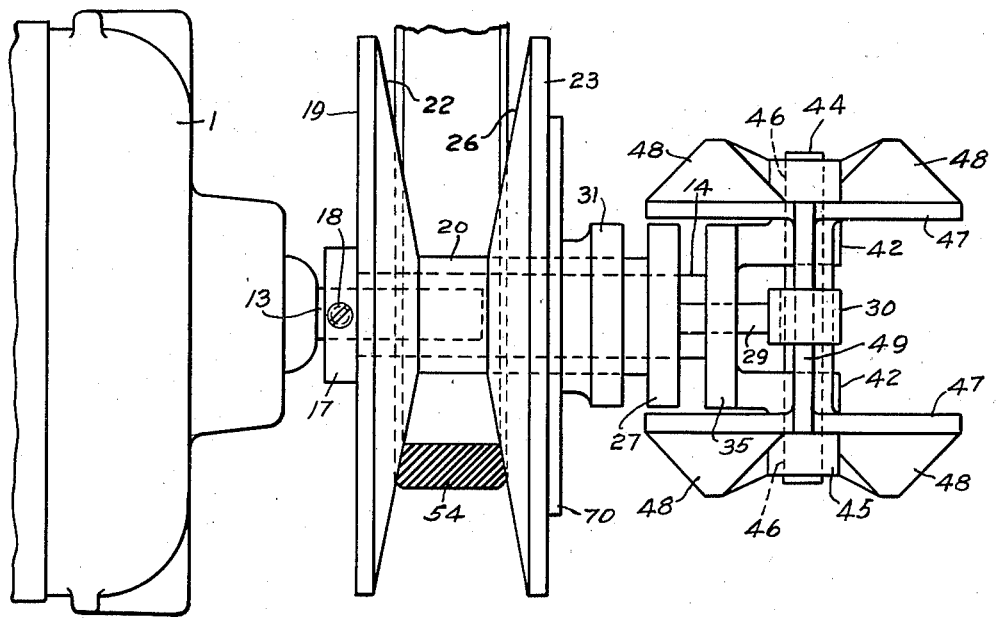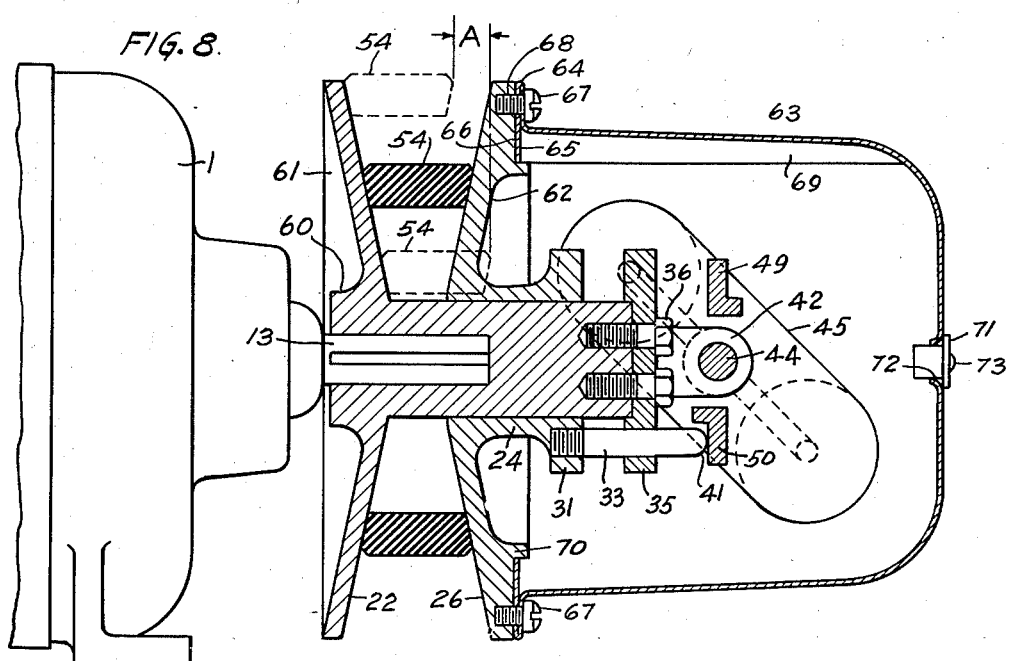

May 17, 1938.  D. E. LEWELLEN ET AL  2,117,483
VARIABLE SPEED DEVICE
Filed July 12, 1935   4 Sheets-Sheet 4
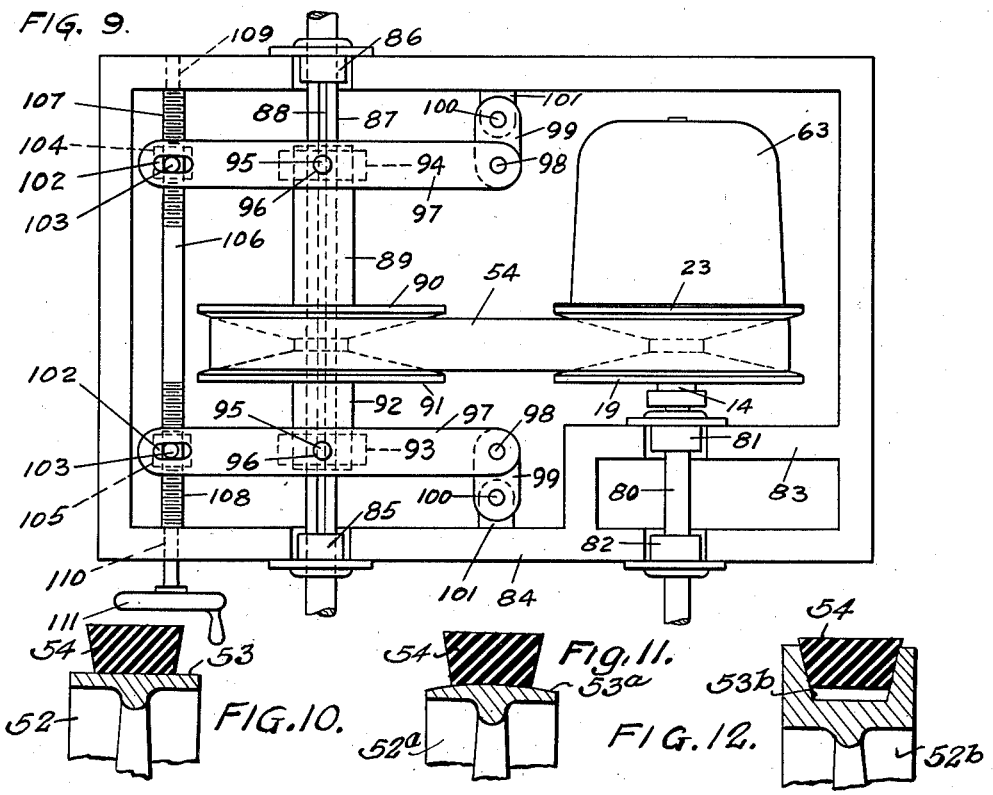
INVENTORS
DARCY E. LEWELLEN AND
EMMONS F. LEWELLEN.
BY
ATTORNEYS.

Patented May 17, 1938

2,117,483

UNITED STATES PATENT OFFICE 2,117,483

VARIABLE SPEED DEVICE

Darcy E. Lewellen and Emmons F. Lewellen, Columbus, Ind.

Application July 12, 1935, Serial No. 31,036

5 Claims. (Cl. 74—230.17)

This invention relates to variable speed devices, and in particular to such devices wherein the speed variation is accomplished by varying the effective diameter of a pulley upon which a belt operates.

One object of this invention is to provide variable speed devices, including a variable speed pulley consisting of separate pulley halves capable of moving toward or away from one another, and urged in one direction by a yieldable force and preferably by centrifugal force.

Another object is to provide a variable speed device wherein the halves of a variable speed pulley are urged toward one another by centrifugally-responsive mechanism having the property of applying a substantially uniform tension to the belt.

Another object is to provide a variable speed device having a variable speed pulley, wherein both pulley halves are movable, with centrifugal force applied to urge the halves toward one another, thereby resisting the tendency of the belt to separate the halves.

Another object is to provide such a device, wherein vibration is materially reduced by the employment of parts and force-producing mechanism having a reduced tendency to vibrate.

Another object is to provide such a device in which the center line of the belt does not shift its position laterally when the speed of the device is changed.

Another object is to provide a variable speed device having the force-applying and pulley-half-moving mechanism completely inclosed, thereby avoiding the defects caused by the entry of dirt or foreign bodies.

Another object is to provide a variable speed device having a lubrication system providing self-lubrication, with but a small quantity of lubricant in a completely inclosed container.

Another object is to provide a variable speed device wherein the driving of the pulley halves is obtained without the use of keys in the discs or disc hubs, thereby avoiding the binding wear and concentrated leverage occasioned by the use of such keys.

Another object is to provide a variable speed device in which the springs customarily used for urging the pulley halves together are eliminated, thereby greatly reducing the vibration and uneven belt tension caused thereby, as well as providing a construction in which the jerking action of such springs on starting and stopping is completely absent.

Another object is to provide a modified variable speed pulley in which one half only is moved in response to centrifugal force.

Another object is to provide a variable speed transmission employing a pair of variable diameter pulleys, at least one of these pulleys consisting of a pair of pulley halves urged in opposite directions by centrifugally-responsive mechanism.

In the drawings:

Figure 1 is a top plan view of the variable speed device of our invention.

Figure 2 is a side elevation, partly in section, of the device shown in Figure 1.

Figure 3 is a front elevation of the device shown in Figures 1 and 2, with the driven pulley omitted for clearness of showing.

Figure 4 is an enlarged fragmentary cross-section along the line 4—4 of Figure 5, showing the lubrication means employed in the device.

Figure 5 is a central vertical section through the variable speed pulley of this invention, taken along the line 5—5 of Figure 1, with the pulley halves separated by their maximum amount.

Figure 6 is a view similar to Figure 5, but with the pulley halves approaching their closed positions to one another.

Figure 7 is a top plan view of the mechanism shown in Figures 5 and 6, but with the end cover removed to disclose the mechanism.

Figure 8 is a central vertical section similar to Figures 5 and 6, but showing a modified form of device.

Figure 9 is a plan view of a variable speed transmission employing the variable speed device of our invention.

Figure 10 is a section on the line 10—10 of Figure 2, showing a flat pulley.

Figure 11 is a section taken in the direction of the line 10—10 of Figure 2, but showing a crown pulley.

Figure 12 is a section taken in the direction of the line 10—10 of Figure 2, but showing a V-grooved pulley.

In general, the variable speed device of our invention includes a pair of conical pulley halves, which are movable longitudinally along the drive shaft upon which they are mounted. The longitudinal motion in one direction is caused by the tendency of the V-belt employed to wedge its way downward between the halves. This motion is opposed by mechanism which employs centrifugal force to urge the pulley halves toward one another. In particular, this mechanism may be so designed as to urge the pulley halves toward one another with such force as to give the belt a substantially uniform tension, regardless of the separation of the pulley halves.

Hitherto, in variable speed pulleys employing separately movable halves, springs have been used to urge the halves together against the tension applied by the belt. These springs have given rise to vibration, have caused a jerky motion in starting and stopping the device, and have caused the belt to be under a substantially different tension when the pulley halves are close together than when they are widely separated. One of the problems faced by inventors was to eliminate these defects occasioned by the use of springs.

Referring to the drawings in detail, Figure 1 shows the variable speed device of our invention as employed in connection with a motor 1, mounted upon a movable slide 2, which is provided with a dove-tailed portion 3 operating in a corresponding dove-tailed groove 4. A nut 5 (Figure 2), attached to the bottom of the movable slide 2, is engaged by a threaded shaft 6 having a portion 7 thereof between the collar 8 and the hub 9 of the hand wheel 10, operating in a bore 11 in the base 12, upon which the entire assembly is supported. Consequently, by turning the hand wheel 10 the slide 2 and the motor 1 may be caused to move backward or forward along the base 12.

The motor 1 is provided with a drive shaft 13, to which a hollow shaft 14 is secured (Figure 5). As shown (Figure 5), the hollow shaft 14 contains a bore 15 for receiving the end of the drive shaft 13, a key 16 being provided to insure driving engagement between the motor drive shaft 13 and the hollow shaft 14. An enlargement 17 at the inner end of the hollow shaft 14 carries a set screw 18, which serves to hold the hollow shaft 14 firmly upon the motor drive shaft 13.

Mounted for longitudinal reciprocation upon the hollow shaft 14 is a pulley half, generally designated 19, and having a sleeve-like hub portion 20 surrounding the hollow shaft 14. The pulley half 19 also has a disc-like portion 21 with a conical inner surface 22. Reciprocably mounted upon the hub portion 20 of the pulley half 19 is a pulley half, generally designated 23, having a sleeve-like hub portion 24 surrounding the sleeve-like hub portion 20 of the pulley half 19. The pulley half 23 also has a disc-like portion 25 with a conical inner surface 26, similar in construction to that of the pulley half 19 described above.

The hub portion 20 of the pulley half 19 carries at its outer end a collar 27, secured firmly thereto by any suitable means and having a threaded bore 28 therethrough. This threaded bore is provided with a threaded pin 29 having secured thereto, on its outer end, a hook 30. Similarly, the hub portion 24 of the pulley half 23 is provided with an enlargement 31, having a threaded bore 32 therein adapted to receive the threaded inner end of a pin 33. A portion of the pin 33 extends loosely through a bore 34 in the collar 27 upon the hub 20 of the pulley half 19.

Mounted on the outer end of the hollow shaft 14 is a collar 35 secured thereto by the cap screws 36, passing through the holes 37 therein and entering the threaded holes 38 in the end of the hollow shaft 14. The collar 35 contains a pair of bores 39 and 40, through which the pins 29 and 33 loosely pass. The outer end of the pin 33 is rounded, as at 41, so as to enable it to engage a member regardless of the angle at which that member is presented.

The collar 35 is provided with a pair of lugs 42 (Figures 5 and 7), having bores 43 serving to receive the cross shaft 44, the latter being tightly held within the bores 43. Pivotally mounted upon the cross shaft 44 is an H-shaped member, generally designated 45, and having bores 46 loosely receiving the outer ends of the shaft 44. The H-shaped member 45 is provided with side arms 47 (Figure 7) having counterweights 48 attached thereto. These counterweights are preferably integral with the side arms 47. Interconnecting the side arms 47 are the cross bars 49 and 50 (Figure 5). These cross bars are of L-shape in cross section, with the base portions of the L's nearest one another and with the vertical portions projecting outward. The vertical portion of the upper cross bar 49 is engaged by the hook 30 attached to the pin 29, thereby operatively connecting the upper cross bar 49 to the pulley half 19. Similarly, the lower cross bar 50 is engaged by the rounded outer end 41 of the pin 33, thereby forming an operative connection between the cross bar 50 and the pulley half 23.

Accordingly, the rotation of the motor shaft 13 will cause the counterweights 48 of the H-shaped member 45 to fly outward in a direction causing the pulley halves to be urged toward one another. The pulley halves 19 and 23 are shown in their separated positions in Figure 5, and in their closely adjacent positions in Figure 6. This result is brought about by the centrifugal force exerted by the rapidly rotating counterweights 48, which is thus creating a couple in a radial direction. This couple gives an outward pull upon the side arms 47 and consequently moves the cross bars 49 and 50 in opposite directions tangentially around the pivot shaft 44 (Figures 5 and 6). The cross bar 49 moves to the right, engaging the end of the hook 30, and pulling the pin 29 and the collar 27 to the right, together with the hub 20 of the pulley half 19 to which the collar 27 is attached. At the same time, the cross bar 50 is forced to the left, pushing the rounded end 41 of the pin 33 to the left, together with the enlarged portion 31 of the pulley half 23 of which the enlargement 31 is a part.

Assuming that the motor 1 is moved to the right upon its slide 2 (Figure 2) in such a manner as to shorten the distance between the centers of the motor shaft 13 and the driven shaft 51, carrying the driven pulley 52 having the rim 53, the belt 54 will be permitted to move outward radially within the pulley halves 19 and 23, passing from the position shown in Figure 5 to the position shown in Figure 6. The belt 54 itself is of so-called V-construction, it being trapezoidal in cross section. As the belt 54 moves outward to an increased effective diameter within the pulley halves 19 and 23, the speed ratio is reduced between the motor shaft 13 and the driven shaft 51, thus causing an increase in the speed at which the driven shaft 51 is driven.

The rim 53 of the driven pulley 52 may be of the flat type shown in Figure 2, or the "crown" type shown in Figure 11, thereby receiving the inner surface of the belt 54, or it may have a V-groove (Figure 12) adapted to receive the sides of the belt 54. It will be understood that the V-belt 54 may operate either upon pulleys 52, 52a or 52b with flat, "crown" or V-groove rims 53, 53a or 53b, respectively, because of its trapezoidal cross section. Accordingly, to increase the speed ratio the operator turns the hand wheel 10 in such a direction as to increase the distance between the centers of the motor shaft 13 and the driven shaft 51. In effect, this causes the motor to drive the belt 54 from a pulley of small diameter. To decrease the speed ratio, however, and increase the speed at which the pulley shaft 51 is driven, the hand wheel 10 is rotated in the opposite direction so as to bring the motor shaft 13 and the driven shaft 51 closer together, in the manner previously described.

The force exerted by the side walls of the belt upon the conical surfaces 22 and 26 of the pulley halves 19 and 23 tends to urge the pulley halves apart. This tendency is opposed by the longitudinal force exerted upon the pins 33 and 29 by the H-shaped member 45 through the action of the centrifugal force upon its counterweights 48. Accordingly, this construction enables an accurate balance to be obtained at all speeds of the motor shaft, and regardless of the separation of the pulley halves 19 and 23.

In the absence of the belt 54 it will be evident that the pulley halves 19 and 23 would be caused to approach one another closely upon the rotation of the motor shaft 13. The side arms 47 of the H-shaped member 45 will tend to assume positions perpendicular to the motor drive shaft 13 and the hollow shaft 14 under these circumstances. With the belt 54 present, however, this tendency is opposed to such an extent that the side arms 47 of the H-shaped member 45 come to rest in the oblique positions shown in Figures 5 and 6.

By suitably proportioning the length of the pins 33 and 29 with its hook 30, the H-shaped member 45 may be caused to assume positions where the belt pressure is nearly uniform. In one size of pulley with which the invention has been employed, for example, the pressure holding the discs together varied only from 30 to 35 pounds, by reason of the proper proportioning of these pins.

In the modified form of variable speed pulley shown in Figure 8, the hub 60 of the left-hand pulley half 61 is mounted directly upon the motor shaft 13 in such a manner as to serve as a support for the hollow hub 24 of the right-hand pulley half 62. In this construction the pulley half 62 and its hub 24 are urged toward the pulley half 61 by means of the pressure exerted by the lower cross bar 50 upon the pin 33 secured in the collar 31 of the hub 24, in a manner similar to that previously described. It will be observed that the pin 29, secured in the collar 27 and having the hook 30, is missing in the form shown in Figure 8. Consequently, one half only of the pulley is movable, and for this reason the belt 54 shifts sidewise as it moves inward or outward in the space formed between the pulley halves 61 and 62. The remainder of the mechanism shown in Figure 8 is similar to that shown in Figures 5 and 6, and similar reference numerals are employed.

Due to the sidewise shifting of the belt 54, however, it is necessary to employ a driven pulley which has a greater width of face than the belt. The minimum width of face which it is possible to employ is equal to the width of the belt, increased by the distance through which the belt must move sidewise. This distance is equal to the dimension A indicated on Figure 8.

The lubrication system employed in both of the disclosed forms of the invention consists of an end cover 63 having a flange 64, with a reversely directed flange 65, secured to the flattened portions 66 of the outer faces of the pulley halves 23 or 62, respectively. The cover 63 is held in tight engagement with the face 66 by means of the set screws 67, threaded into the screw holes 68 in the right-hand pulley half. The right-hand pulley half is also provided with an annular projection 70, against which the inner edge of the flange 65 rests. When the motor is stopped the accumulation of oil will run down the faces of the pulley halves 23 or 62, but must pass over the annular projection 70. This construction prevents the escape of the oil through the space between the flange 65 and the face 66 of the right-hand pulley half.

The end cover 63 at one point in its periphery is provided with a V-shaped baffle 69 (Figures 4 and 5), extending longitudinally along the end cover 63. This baffle 69 serves as a dam against which the lubricant will impinge as the end cover 63 rotates with the pulley. Due to the viscosity of the oil and the friction between it and the inside of the cover 63, there will be a drag between the oil and the cover 63 so that the former will lag behind the latter. As the oil impinges upon either side of the baffle 69 it will be forced inward until it escapes over the edge of the baffle 69. This will cause the oil to be thrown off the baffle in a spray or cloud of drops into the mechanism at the center of the cover 63. The V-shaped baffle 69 operates effectively in either direction of rotation of the cover 63, hence, effective lubrication is obtained regardless of the direction of rotation of the motor. Only a small quantity of lubricant is required because of this construction. Additional lubrication is supplied through the oiling plug 71, mounted in the aperture 72 in the center of the end cover 63. This oiling plug 71 is of the conventional construction, and has the usual ball valve 73 to prevent the escape of lubricant.

In the construction shown in the drawings and described above the variation of speed has been accomplished by moving the motor in or out so as to vary the distance between the centers of the motor shaft 13 and the driven pulley shaft 51.

The variable speed transmission shown in plan view in Figure 9 employs the variable speed device previously described in connection with Figures 1 to 7, inclusive. The hollow shaft 14, upon which the pulley halves 19 and 23 are slidably mounted, is keyed or otherwise fixedly secured to the inner end of the drive shaft 80. The mechanism for centrifugally urging the pulley halves 23 and 19 toward one another is contained within the end cover 63, and is of the character previously described. The drive shaft 80 is rotatably supported in bearings 81 and 82, located in a subframe 83 and main frame 84, respectively. The main frame 84 is likewise provided with bearings 85 and 86, rotatably supporting the driven shaft 87, having a key slot 88 extending longitudinally therein.

Slidably mounted along the driven shaft 87 are the hubs 89 and 92, respectively, of the pulley halves 90 and 91. Each of the hubs 89 and 92 is provided with thrust bearings 93 and 94, respectively. These thrust bearings have outwardly projecting bosses 95 arranged to engage apertures 96 in links 97. The latter are pivotally secured, as at 98, to the float links 99, which in turn, are pivotally supported at 100 upon the frame projections 101. The outer ends of the links 97 are provided with slots 102 arranged to receive the bosses 103 projecting outwardly from the nuts 104 and 105. The nut 104 is mounted upon a left-hand threaded portion 107 of a screw shaft 106, whereas the nut 105 is similarly mounted upon the right-hand threaded portion 108 of the same shaft.

The screw shaft 106 is rotatably supported at 109 and 110 in the main frame 84, and carries a hand wheel 111 by which the screw shaft 106 may be rotated in either direction. By the rotation of the hand wheel 111 the pulley halves 90 and 91 may be caused to approach one another or recede from one another. At the same time the pulley halves 19 and 23 are caused to recede from or approach one another by the centrifugal mechanism within the end cover 63 in response to the changing position of the belt 54. Accordingly, the pulley halves 19 and 23 are instantly responsive to the changes in the separation of the pulley halves 90 and 91, and a substantially uniform tension is applied to the belt regardless of the separation of the pulley halves, and without the necessity for springs which give rise to vibration and varying tensions.

The variable speed transmission shown in Figure 10 consists of a main frame 112 having a cross bar 113. These contain bearings 114 and 115, respectively, serving to support the outer and inner ends of the drive shaft 116 and driven shaft 117 of the transmission. The hollow shafts 14 are fixedly mounted by keys, or other suitable construction, upon the drive shaft 116 and driven shaft 117, and the pulley halves 19 and 23 on the drive shaft 116 are provided with centrifugally-responsive mechanism contained in the end cover 63. Similarly, the pulley halves 19a and 23a, upon the driven shaft 117, are provided with centrifugally-responsive mechanism contained within the end cover 63a.

The variable speed transmission shown in Figure 10 is adjusted by varying the position of an idler pulley 118, which is rotatably supported upon the downwardly depending arms 119 and 120, secured to a sleeve 121 upon an overhead shaft 122. The latter is supported by the main frame 112 and the cross bar 113 at the points 123 and 124, respectively. The collars 125 secured to the shaft 122 by the set screws 126 prevent end motion of the shaft 122. The sleeve 121, carrying the arms 119 and 120, is secured to the shaft 122 by means of the set screw 127.

Thus the invention provides centrifugally-responsive mechanism which urges the pulley halves in opposite directions by a force which exerts a substantially uniform tension upon the belt. This centrifugal mechanism is free from the vibrational effects caused by the springs previously used, and also from the varying tensions necessarily applied to the belt by these springs. Such springs must necessarily have a sufficient tension to exert the desired pressure upon the belt when the discs are at their closest approach to one another, so that a driving connection is maintained between them and the belt. At the same time, any movement of the discs as they separate materially increases the spring tension and with it the belt tension.

The sole method of reducing the uneven pressure of springs is to increase the length of the wire therein. If either the diameter of the spring or its length is increased to accomplish this, however, the vibration of the device also increases to an undesirable extent. Accordingly, it has been hitherto necessary to employ a short spring of small diameter and to endure the resulting vibration, varying force and jerking action to which the spring gives rise.

In the centrifugally-responsive device of our invention the force exerted increases gradually from zero as the drive shaft starts to rotate, and moves up to its uniform speed. Accordingly, the pulley halves are urged in opposite directions by a force which increases smoothly and without jerking motion. The elimination of the springs also eliminates the vibrational effects to which they hitherto have given rise.

The above-described variable speed device has been illustrated in connection with a motor mounted upon a movable slide (Figures 1, 2 and 3). It will be understood, however, that the advantages of the invention can likewise be achieved by moving the mounting of the driven shaft 51, thereby also increasing the distance between the centers of the drive shaft 13 and driven shaft 51. In some installations this moving of the driven shaft instead of the drive shaft is found more suitable.

We desire to comprehend within our invention such modifications as may be embraced within the claims and the scope of the invention.

Having thus fully described our invention, what we claim as new and desire to secure by Letters Patent, is:

1. A variable speed device comprising a shaft, means to rotate said shaft, a pulley half slidable along said shaft and having a hub extending along said shaft, a second pulley half slidable independently of said first pulley half upon the hub thereof, a centrifugal member, means upon the end of said shaft pivotally supporting said centrifugal member and means operatively connecting said centrifugal member with said pulley halves to simultaneously move both of said pulley halves oppositely relatively to one another in response to the outward motion of said centrifugal member upon the rotation of said shaft.

2. A variable speed device comprising a shaft, means to rotate said shaft, a pulley half slidable along said shaft and having a hub extending along said shaft, a second pulley half slidable independently of said first pulley half upon the hub thereof, an arm having counterweights thereon, means upon the end of said shaft pivotally supporting said arm, and means operatively connecting said arm to said pulley halves and arranged to simultaneously move both of said pulley halves oppositely relatively to one another upon the rotation of said shaft.

3. A variable speed device comprising a shaft, means to rotate said shaft, a pulley half slidable along said shaft and having a hub extending along said shaft, a second pulley half slidable independently of said first pulley half upon the hub thereof, an arm having counterweights thereon, means upon the end of said shaft pivotally supporting said arm, and means operatively connecting said arm to said pulley halves and arranged to simultaneously move both of said pulley halves oppositely relatively to one another upon the rotation of said shaft, said connecting means comprising a pair of members secured to said pulley halves and arranged to be engaged by said arm.

4. A variable speed device comprising a shaft, a pulley half slidably mounted on said shaft, a second pulley half slidably mounted relatively to said first pulley half, a centrifugal member, means operatively interconnecting said centrifugal member with said pulley halves to move both of said pulley halves axially simultaneously in opposite directions in response to the rotation of said shaft, and a bearing member mounted on one end of said shaft externally of said pulley halves, said bearing member pivotally supporting said centrifugal member.

5. A variable speed device comprising a shaft, a pulley half slidably mounted on said shaft, a second pulley half slidably mounted relatively to said first pulley half, a centrifugal member, means responsive to the motion of said centrifugal member for moving both of said pulley halves axially simultaneously in opposite directions in response to the rotation of said shaft, and a bearing member mounted on one end of said shaft externally of said pulley halves, said bearing member pivotally supporting said centrifugal member, said centrifugal member comprising an H-shaped member having its cross bar pivotally mounted on said bearing member.

DARCY E. LEWELLEN.
EMMONS F. LEWELLEN.